United States Patent
Lyu

(10) Patent No.: US 7,522,218 B2
(45) Date of Patent: Apr. 21, 2009

(54) DISPLAY DEVICE AND METHOD FOR CONTROLLING THE SAME

(75) Inventor: Su Jung Lyu, Daegu (KR)

(73) Assignee: LG Electronics Inc., Seoul (KR)

( * ) Notice: Subject to any disclaimer, the term of this patent is extended or adjusted under 35 U.S.C. 154(b) by 576 days.

(21) Appl. No.: 11/166,167

(22) Filed: Jun. 27, 2005

(65) Prior Publication Data

US 2006/0158556 A1    Jul. 20, 2006

(30) Foreign Application Priority Data

Jan. 20, 2005    (KR)    ........................ 10-2005-0005325

(51) Int. Cl.
*H04N 5/45*    (2006.01)
(52) U.S. Cl. ........................ 348/565; 348/562; 348/468; 348/566; 348/577
(58) Field of Classification Search ......... 348/563–569, 348/468, 560, 562, 577, 582, 597, 599, 603, 348/617, 556, 584, 621, 630, 649, 673, 635; 345/589, 617, 630, 636; *H04N 5/45, 5/445*
See application file for complete search history.

(56) References Cited

U.S. PATENT DOCUMENTS

| | | | |
|---|---|---|---|
| 6,532,041 B1 | 3/2003 | Monta et al. | |
| 6,563,546 B2 * | 5/2003 | Saiki et al. | 348/553 |
| 6,788,308 B2 * | 9/2004 | Reavy et al. | 345/617 |
| 7,027,101 B1 * | 4/2006 | Sloo et al. | 348/564 |
| 7,042,511 B2 * | 5/2006 | Lin | 348/445 |
| 2002/0113801 A1 | 8/2002 | Reavy et al. | 345/589 |
| 2003/0112253 A1 | 6/2003 | Cazier et al. | |

FOREIGN PATENT DOCUMENTS

AU    745947    11/2000

OTHER PUBLICATIONS

European Search Report dated Jul. 29, 2008.
Chinese Office Action dated Jun. 27, 2008.

* cited by examiner

*Primary Examiner*—Trang U Tran
(74) *Attorney, Agent, or Firm*—KED & Associates LLP

(57) ABSTRACT

Display devices and methods for controlling the same are provided, which can display text along with video that satisfy prescribed visual criteria. Accordingly, the text can be more easily seen by a viewer. A method can include a) detecting color information of a text and color information of a video from received broadcasting signals, b) determining a color difference between the video and the text based on the two color information, c) comparing the determined color difference with a reference value, and d) controlling the color difference between the text and the video depending on the compared result.

20 Claims, 5 Drawing Sheets

DISPLAY DEVICE AND METHOD FOR CONTROLLING THE SAME

BACKGROUND OF THE INVENTION

1. Field of the Invention

The present invention relates to a display device and a method for controlling the same.

2. Background of the Related Art

Recently, a display device includes a TV. A broadcasting signal transmission mode is developed as a TV technique. In this respect, attention on a digital TV based on a digital transmission mode is increasing. For digital broadcasting, broadcasting of high picture quality and high sound quality is broadcasted through satellite/terrestrial/cable bands. Unlike the existing analog TV, a digital TV has service functions based on various additional information as well as high picture quality and high sound quality.

In digital broadcasting, video is based on MPEG-2 (Moving Picture Experts Group-2) and audio is based on AC-3 (Audio Compression-3) compression method. The compressed data can be transmitted to each user using transmission methods such as QPSK/VSB/QAM through the existing satellite/terrestrial/cable bands. The compression technique provides various services. In case of terrestrial waves, four or more channels of SD grade can be broadcast, and one channel of HD grade can be broadcast. The digital TV transmits supplementary information along with video and audio data to provide various services. For example, a broadcasting guide service on increased channel information can be provided using such supplementary information.

As described above, the digital video is based on the MPEG-2 standard, and can fundamentally support 18 formats. The digital audio is based on the AC-3 standard and can be processed in a Dolby digital mode. A program and service information protocol (PSIP) standard can be provided as the system standard to support major and minor channel numbers of the current program, its video and audio stream data, and its detailed data.

The digital stream data can consist of video, audio, supplementary information, and channel information, which are received in a multiplexing mode. Therefore, a receiver demultiplexes the multiplexed data to be suitable for a determined standard to reconstruct video data, audio data, and supplementary information.

Further, since user options for various data are increased with spread of the digital TV, items to be set by the user become various and complicated and items of menu are also increased. Therefore, with change of user's taste and change of systems from analog to digital, items set as basic values in hardware or system can be set in various manners depending on user's condition or taste. For example, effective use of digital contents, various functions, and specialized service functions have been additionally provided in the menu items. Thus, menus to be selected by the user become complicated and dependency on user's option is increased.

Further, in the related art display device, video signals and text are independently transmitted and controlled so that a color of the text is designated regardless of a color of the video. For this reason, readability of the text may be deteriorated.

FIG. 1 illustrates a block diagram of a related art image display device. FIG. 2 illustrates a flow chart of a related art method for displaying texts.

As shown in FIGS. 1 and 2, a broadcasting signal is selected by a signal input unit 11 (block S11), and then a demultiplexer 12 separates the broadcasting signal to a video signal, an audio signal, and supplementary information. Subsequently, a controller 18 extracts text data included in the broadcasting signal (block S12). Then, the controller 18 transmits the extracted text data to a video processor 13. The video processor 13 receives the video signal from the demultiplexer 12 and receives the text data from the controller 18. Additionally, the image processor 13 displays the video signal and the text and, simultaneously, displays a portion surrounding the text with a predetermined color (block S13) using a display portion 14. The background color of the surrounding portion of the text is displayed either in white or black.

An audio processor 15 receives the audio signal from the demultiplexer 12 for reproduction using a speaker 16. A memory 19 is connected to the controller 18.

As described above, however, the related art image display device and text displaying method have various disadvantages. For example, in the related art, the color of the surrounding portion of a text, namely, the picture (or image) neighboring the text, may cause a problem in that the text is covered or hidden. Further, if the color of the text is similar to the background color, the viewer may have difficulty identifying and clearly viewing the text that is being displayed.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Another object of the present invention is to provide a display device and a method for controlling the same that substantially obviates one or more problems caused by limitations and disadvantages of the related art.

Another object of the present that increases visibility of text displayed along with video.

Another object of the present invention is to provide a display device and a method for controlling the same in which text displayed along with video can satisfy a prescribed color relationship.

Another object of the present invention is to provide a display device and a method for controlling the same in which text displayed along with video can be modified to exceed a prescribed color space difference.

To achieve at least these objects and other advantages in whole or in part and in accordance with the purpose of the invention, as embodied and broadly described herein, there is provided a method for controlling a display device that includes detecting color information of a text and color information of a video from received broadcasting signals, determining a color difference between the video and the text based on the two color informations, comparing the determined color difference with at least one reference value, and controlling the color difference between the text and the video depending on the compared result.

To further achieve at least these objects and other advantages in whole or in part and in accordance with the purpose of the invention, as embodied and broadly described herein, there is provided a display device that includes a controller configured to determine a color difference between video and text based on color information of the text and color information of the video and compare the color difference with one or more reference values, wherein the color information is detected from received broadcasting signals, and a video processor configured to control the color information of the text depending on the compared result of the controller.

To further achieve at least these objects and other advantages in whole or in part and in accordance with the purpose of the invention, as embodied and broadly described herein, there is provided a method for controlling a display device that includes detecting visual characteristics of a text and visual characteristics of a video from received broadcasting signals, determining a relationship between the video and the text based on the two visual characteristics, comparing the determined relationship with at least one reference value, and modifying a criteria of the visual characteristics for the text or the video depending on the compared result.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made to the embodiments of the invention, examples of which are illustrated in the accompanying drawings.

Figure 1:
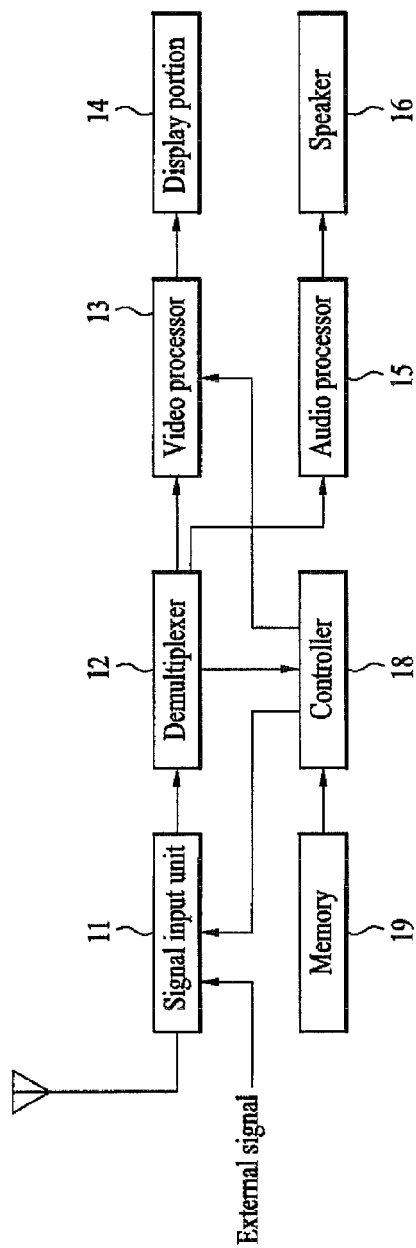
FIG. 1 illustrates a block diagram of a related art image display device.
Figure 2:
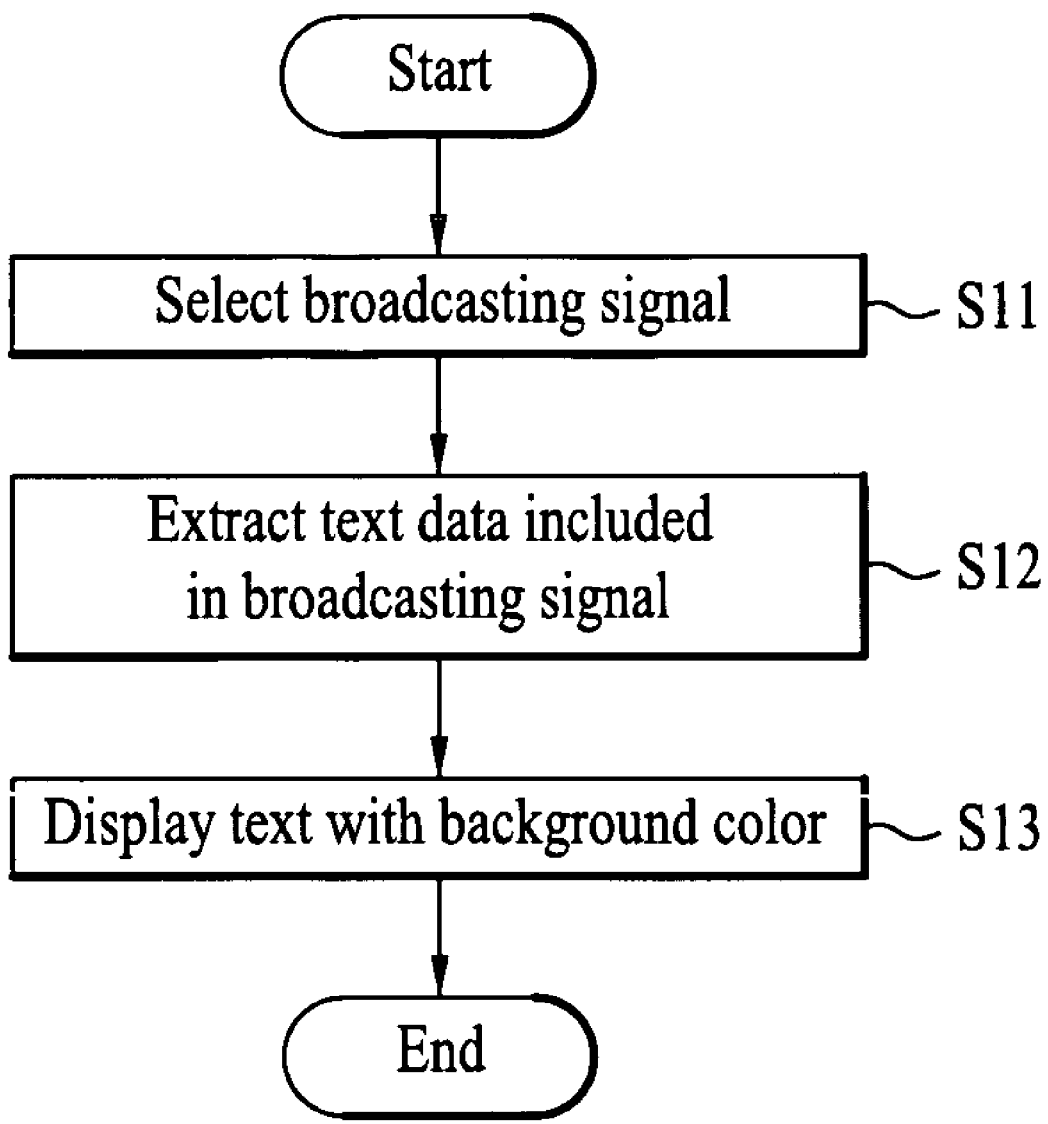
FIG. 2 illustrates a flow chart of a related art method for displaying texts.
Figure 3:
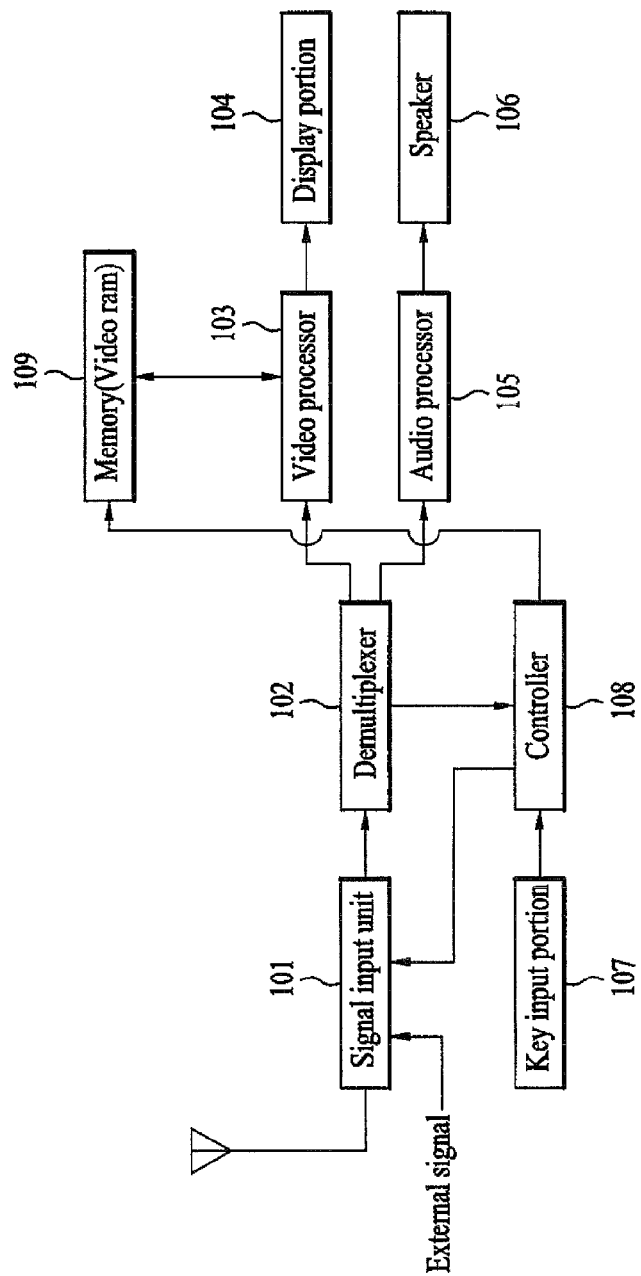
FIG. 3 is a diagram that illustrates a display device according to an embodiment of the invention.

An embodiment of a display device according to the invention will be described with reference to FIG. 3. As shown in FIG. 3, a signal input unit 101 can include a tuner and/or an external signal receiver or the like. The tuner can receive broadcasting signals through an antenna, a cable, or a set top box and tunes (e.g., selects) a user's desired channel. The external signal receiver can receive video/audio signals from external devices, such as a DVD, a VCR, a PVR (personal video recorder), and so on.

A demultiplexer 102 can separate the received broadcasting signal to a video signal, an audio signal, and a data signal (e.g., supplementary information), and transmit the video signal to a video processor 103 and the audio signal to an audio processor 105. The data signal can be stored in a memory 109 such as a video random access memory (RAM) or the like through a controller 108. One or more reference values used to determine whether the color difference between video and text to be displayed is suitable for a viewer can be stored in the device (e.g., the memory 109). The reference values can be set by a manufacturer or a user. The text may include one or more words, (including symbols or numbers), sentences or caption, for example.

The controller 108 can determine whether the text is included in the separated video signal. Preferably, when the text is included in the video signal, the controller 108 can detect a color of the text and a color of a video portion where the text is to be displayed. The controller 108 can compare the color difference between the text and the video portion with the stored reference value(s). Further, the controller 108 can control the color difference between the text and the video portion depending on the compared result to allow the viewer to more effectively read the text or to satisfy a prescribed relationship (e.g., color difference or visibility condition).

The video processor 103 can control the color of the text (e.g., under the control of the controller 108) to control the color difference between the text and the video portion. A display portion 104 can receive text data and video data output from the video processor 103 and display the text data and the video data on the screen.

The audio processor 105 can receive the audio signals from the demultiplexer 102 and output the audio signals through a speaker 106. A key input portion 107 can be coupled to the controller 108.

Figure 4:
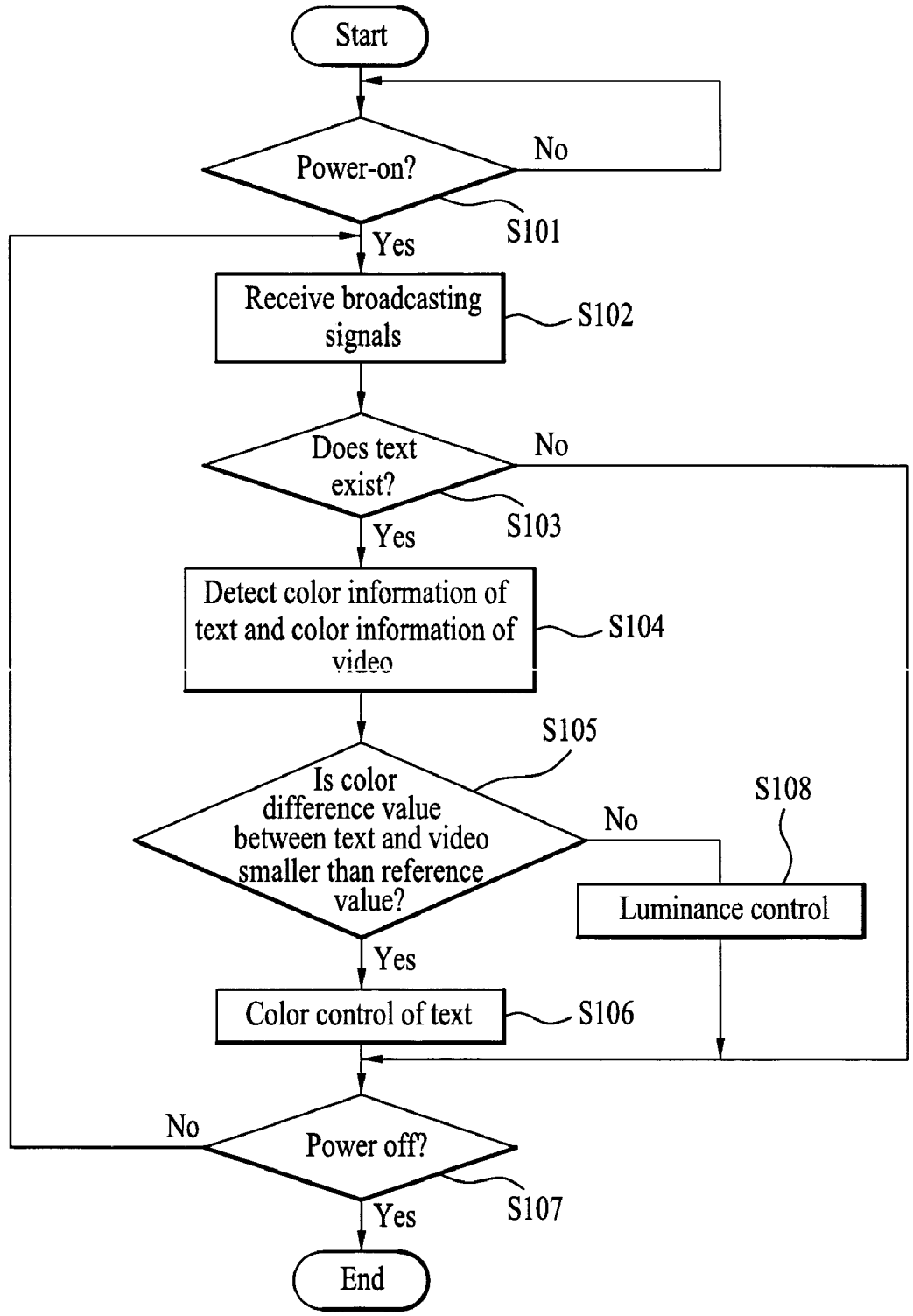
FIG. 4 is a flowchart that illustrates a method for controlling a display device according to a first embodiment of the invention.

FIG. 4 is a flow chart illustrating a method for controlling the display device according to a first embodiment of the invention. The method shown in FIG. 4 can be applied to and described using the embodiment of the display device shown in FIG. 3. However, the present invention is not intended to be so limited.

As shown in FIG. 4, after a process starts, if a user inputs "power-on" command or "channel change" command through a remote controller or the key input portion 107 such as a key panel (block S101), the controller 108 can control the signal input unit 101 to receive broadcasting signals of a corresponding channel.

The demultiplexer 102 can receive the broadcasting signals through the signal input unit 101 (block S102), and separate a received broadcasting signal into a video signal, an audio signal, and a data signal or the like. The controller 108 can determine whether the text is included in the received broadcasting signals (block S103). The controller 108 may determine whether the text is included in the broadcasting signals before, during or after the broadcasting signal is separated to the video signal, the audio signal, and the data signal.

When it is determined that at least one text is included in the broadcasting signals (block S103), the controller 108 can detect color information of the text and color information of a background video (e.g., where text can be displayed) to identify a color of the text included in the broadcasting signals and a color of the background video overlapped (e.g., near or adjacent) with the text (block S104).

If the color information of the text and the color information of the background video are detected, the controller 108 can calculate or determine the color difference between the text and the background video using the detected color information and compare the calculated difference value with one or more reference values (block S105). For example, the controller 108 can compare the color difference between the text and the background video with one reference value. The controller 108 can determine that it is difficult for the viewer to read (e.g., see) the text if the color difference is smaller than the reference value. Then, the controller 108 can control the color of the text to allow the color difference to be equal to or greater than the reference value (block S106). When the color difference is greater than or equal to the reference value (block S105), the controller 108 can preferably control only a luminance value of the text at a set value (block S108). If the user inputs "power-off" command, the controller 108 can end all the functions (block S107).

Moreover, embodiments of the invention are not intended to be so limited. For example, the controller 108 may compare characteristics such as the color difference between the text and the background video with first and second reference values. If the color difference is between the first reference value and the second reference value, the controller 108 can determine that the text is easily visible and read well by the viewer. If the color difference is smaller than the first reference value, the controller 108 can determine that it is difficult for the viewer to read the text, and control (e.g., modify (block S106)) the color of the text to have the color difference between the first and second reference values. Meanwhile, if the color difference is greater than the second reference value, the controller 108 can control the color of the text to again have (e.g., exist (block S106)) the color difference between the first and second reference values, or control luminance of the text based on the reference values (e.g., block S108).

An exemplary example of a method for controlling the color of the text will now be described. However, the invention is not intended to be so limited.

For example, the controller 108 can calculate an average value of color information of respective pixels corresponding to the background video to obtain color information of the background video. When the position of the text corresponds to (x,y) and the size of the text corresponds to (w,h), the color information of the background video can be an average value ($\overline{Y}, \overline{Cb}, \overline{Cr}$) of the color information (Y, Cb, Cr) in the range from the position $$\left(x - \frac{w}{2}, y - \frac{h}{2}\right)$$

to the position $$\left(x + w - \frac{w}{2}, y + h - \frac{y}{2}\right).$$

If the color information of the text including luminance components and two color components correspond to (Yt, Ctb, Ctr), the color control range of the text considering visual characteristics can be as follows.

$\overline{Y} - \alpha \langle Yt \langle \overline{Y} + \alpha, \overline{Cb} - \beta \langle Ctb \langle \overline{Cb} + \beta$, and $\overline{Cr} - \gamma \langle Ctr \langle \overline{Cr} + \gamma$, wherein, $\alpha$ represents $0.1 \times \overline{Y}$, $\beta$ represents $0.2 \times \overline{Cb}$, and $\gamma$ represents $0.2 \times \overline{Cr}$.

According to Weber's law, human eyesight can fail to sense the luminance difference of 1% to 3% and has sensitivity lower than two times that of luminance in sensing the color difference. Therefore, one or more reference values that can easily identify the color difference between video in view of human eyesight and the text can be preferably stored in the memory 109. In case of luminance, 10% corresponding to three times of minimum sensitivity can be used as a reference value. In case of color, 20% corresponding to two times of luminance can be used as a reference value. If the color difference value between the video and the text is smaller than the set reference value, it is determined that readability of the text is low, therefore color control can be performed (e.g., block S106). Further, if the color difference value between the video and the text exceeds the set reference value, it may disturb the user's viewing with regard to TV. Therefore, only the luminance value Yt may be controlled at the set reference value (e.g., block S108).

Figure 5:
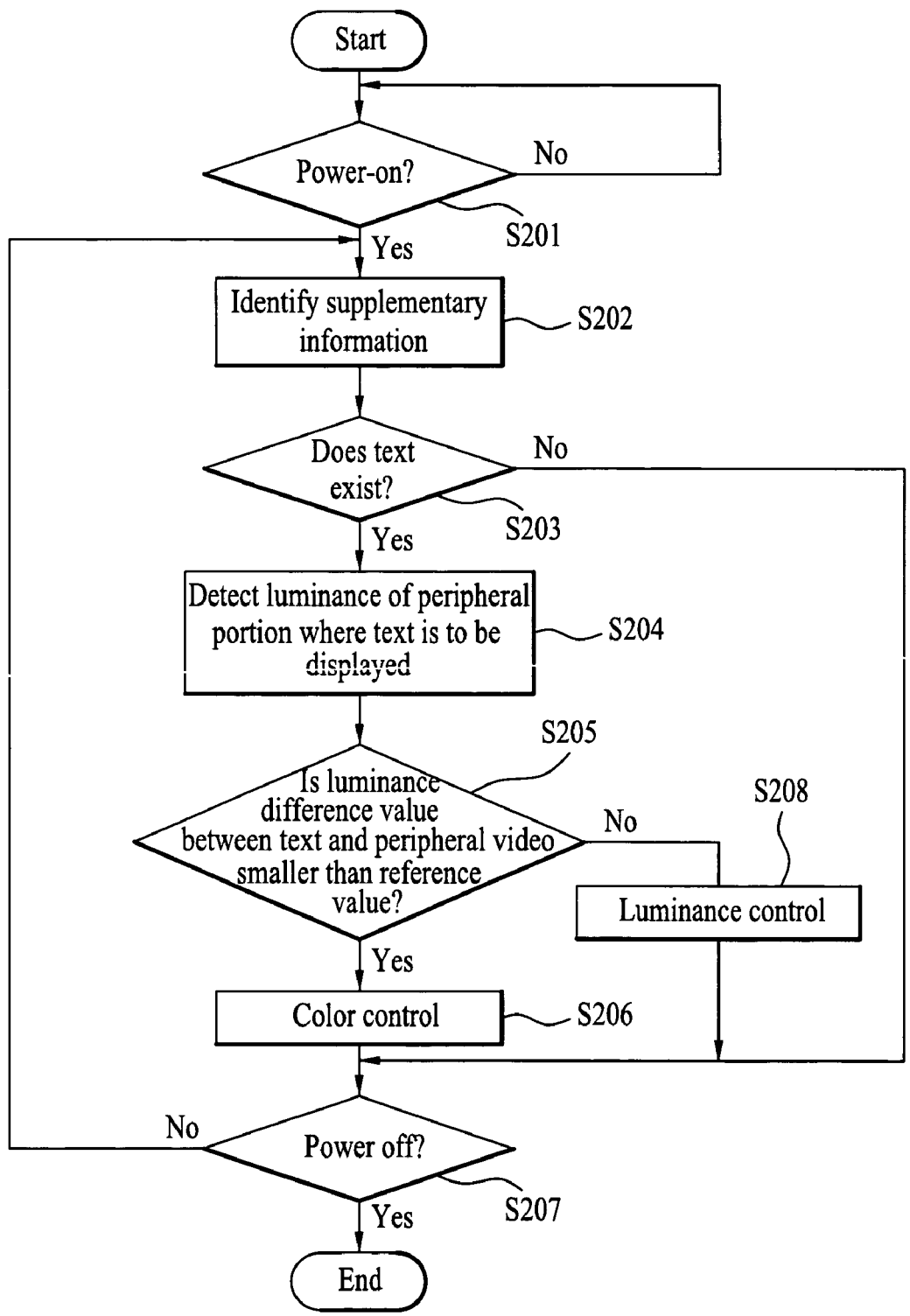
FIG. 5 is a flowchart that illustrates a method for controlling a display device according to a second embodiment of the invention.

FIG. 5 is a flow chart illustrating a method for controlling the display device according to a second embodiment of the invention. The method shown in FIG. 4 can be applied to and described using the embodiment of a display device shown in FIG. 3. However, the present invention is not intended to be so limited.

As shown in FIG. 5, after a process starts, if a user inputs "power-on" command or "channel change" command through a remote controller or the key input portion 107 such as a key panel (block S201), the controller 108 can control the signal input unit 101 to receive broadcasting signals of a corresponding channel.

The demultiplexer 102 can receive the broadcasting signals through the signal input unit 101 and separate the received broadcasting signals into video signals, audio signals, and data signals. The controller 108 can identify whether text information exists in the data signal in order to determine whether the text is included in the received broadcasting signals (block S202).

If it is determined that the text information is included in the data signal (block S203), the controller 108 can determine a color and luminance of the text included in the broadcasting signal based on the text information included in the data signal, and detect color information and luminance information of a background video (e.g., where text can be displayed) from the video signal to identify a color and luminance of the background video overlapped with the text (block S204).

Then, the controller 108 can calculate the luminance difference between the text and the background video and compares the calculated luminance difference value with a previously stored reference value (block S205). The controller 108 can determine that it is difficult for the viewer to read (e.g., view) the text if the luminance difference is smaller than the reference value. The controller 108 can control the color of the text to allow the color difference to be greater than or equal to a reference value (block S206). By contrast, if the luminance difference is greater than or equal to the reference value, the controller 108 can control only a luminance value of the text to satisfy a set value (block S208). If the user inputs "power-off" command, the controller 108 can end all the functions (block S207).

As described above, embodiments of a display device and methods for controlling the same according to the invention have various advantages. For example, since the text received along with the video is sensed and the color of the text is changed depending on a relationship such as a color relationship like the color difference between the video and the text, readability of the text can be increased or improved. In addition, since readability of the text can be improved without changing the video around the text, the user can increase satisfactory viewing in watching TV.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. Furthermore, for ease of understanding, certain method procedures may have been delineated as separate procedures; however, these separately delineated procedures should not be construed as necessarily order dependent in their performance. That is, some procedures may be able to be performed in an alternative ordering, simultaneously, etc.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method for controlling a display device, the method comprising:
   receiving a signal including video data and supplementary information, the supplementary information including text data, position information of the text data relative to the video data, and size information of the text data;
   displaying the received signal so that the text data overlaps the video data according to the position information and the size information;
   detecting color information of the text data;
   selecting a portion of the video data based on the position information and the size information;
   detecting color information of the selected portion;
   determining a color difference between the video data and the text data included in the received signal, based on the detected color information of the text data and the detected color information of the selected portion;
   comparing the determined color difference with at least one reference value; and
   controlling a display characteristic of the text data depending on a result of said comparing, said text data display characteristic controlling comprising only one of:
      controlling the color difference between the text data and the video data by controlling a color of the displayed text data; and
      controlling a luminance of the displayed text data.

2. The method according to claim 1, wherein the detecting color information of the selected portion comprises calculating an average value of colors of respective pixels corresponding to the selected portion.

3. The method according to claim 1, wherein controlling the color difference comprises modifying the color of the displayed text data to increase the color difference when the color difference is smaller than the at least one reference value.

4. The method according to claim 1, wherein the luminance of the displayed text data is controlled when the color difference is greater than or equal to the at least one reference value.

5. The method according to claim 1, wherein controlling the color difference comprises:
   maintaining the color difference when the color difference is between first and second reference values; and
   modifying the color difference when the color difference is not between the first and second reference values.

6. The method according to claim 5, wherein the color difference below the first reference value and the color difference greater than the second reference value is changed to be between the first and second reference values by modifying the color of the displayed text data.

7. The method according to claim 1, wherein said text data display characteristic controlling further comprises:
   maintaining the color difference when the color difference is between first and second reference values; and
   controlling the luminance of the displayed text data when the color difference is greater than the second reference value.

8. The method according to claim 7, wherein the luminance of the displayed text data is set to a value based on the first and second reference values.

9. A display device, comprising:
   a signal input device configured to receive a signal including video data and supplementary information, the supplementary information including text data, position information of the text data relative to the video data, and size information of the text data;
   a display configured to display the received signal so that the text data overlap the video data according to the position information and the size information;
   a controller configured to detect color information of the text data, select a portion of the video data based on the position information and the size information, detect color information of the selected portion, determine a color difference between the video data and the text data included in the received signal, based on the detected color information of the text data and the detected color information of the selected portion, and compare the determined color difference with at least one reference value; and
   a video processor configured to control a display characteristic of the text data depending on a result of the comparing by said controller, the text data display characteristic control comprising only one of:
      controlling the color difference between the text data and the video data by controlling a color of the displayed text data; and
      controlling a luminance of the displayed text data.

10. The display device according to claim 9, wherein the controller calculates an average value of colors of respective pixels corresponding to the selected portion.

11. The display device according to claim 9, wherein the video processor is configured to modify the color of the displayed text data to increase the color difference when the color difference is smaller than the at least one reference value.

12. The display device according to claim 9, wherein the luminance of the displayed text data is controlled when the color difference is greater than or equal to the at least one reference value.

13. The display device of claim 9, wherein the video processor is configured to control the color of the displayed text data by maintaining the color difference when the color difference is between first and second reference values and modifying the color difference when the color difference is not between the first and second reference values.

14. The display device of claim 13, wherein the color difference below the first reference value and the color difference greater than the second reference value is changed to be between the first and second reference values by modifying the color of the displayed text data.

15. The display device according to claim 9, further comprising a memory configured to store the at least one reference value.

16. The display device according to claim 9, wherein the text data display characteristic controlling further comprises:
   maintaining the color difference when the color difference is between first and second reference values; and
   controlling the luminance of the displayed text data when the color difference is greater than the second reference value.

17. The display device according to claim 16, wherein the luminance of the displayed text data is set to a value based on the first and second reference values.

18. A method for controlling a display device, the method comprising:
   receiving a signal including video data and supplementary information, the supplementary information including text data, position information of the text data relative to the video data, and size information of the text data;
   displaying the received signal so that the text data overlaps the video data according to the position information and the size information;
   detecting visual characteristics of the text data;
   selecting a portion of the video data based on the position information and the size information;
   detecting visual characteristics of the selected portion;
   determining a relationship between the video data and the text data based on the detected visual characteristics of the text data and the detected visual characteristics of the selected portion;
   comparing the determined relationship with at least one reference value; and
   modifying a criterion of the visual characteristics for the text data or the video data depending on a result of said comparing.

19. The method according to claim 18, wherein the visual characteristics detected by said visual characteristics detecting include luminance information of the displayed text data and luminance information of the displayed video data and wherein the relationship determined by said relationship determining includes a luminance difference between the video data and the text data included in the received signal.

20. The method according to claim 18, wherein said criterion modifying comprises at least one of:
   controlling a color difference between the text data and the video data by controlling a color of the displayed text data; and
   controlling a luminance of the displayed text data.

* * * * *